(12) United States Patent
Chao et al.

(10) Patent No.: US 10,291,072 B2
(45) Date of Patent: May 14, 2019

(54) WIRELESS POWER DISTRIBUTION MANAGEMENT IN AN OPEN ENVIRONMENT

(71) Applicant: International Business Machines Corporation, Armonk, NY (US)

(72) Inventors: Ching-Yun Chao, Austin, TX (US); Mark E. Elliott, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 15/149,643

(22) Filed: May 9, 2016

(65) Prior Publication Data

US 2017/0324278 A1  Nov. 9, 2017

(51) Int. Cl.
*H02J 5/00* (2016.01)
*H02J 50/12* (2016.01)
*H02J 50/40* (2016.01)
*H02J 50/80* (2016.01)

(52) U.S. Cl.
CPC .............. *H02J 50/12* (2016.02); *H02J 50/40* (2016.02); *H02J 50/80* (2016.02)

(58) Field of Classification Search
CPC .. H02J 50/00; H02J 50/10; H02J 50/60; H02J 50/80; H02J 50/90
USPC ........................................................ 307/104
See application file for complete search history.

(56) References Cited

U.S. PATENT DOCUMENTS 8,234,189 B2 * 7/2012 Taylor .................... G06Q 20/10
  705/34
2011/0095618 A1 * 4/2011 Schatz ..................... H03H 7/40
  307/104
2012/0112691 A1  5/2012 Kurs et al.
2012/0290470 A1 * 11/2012 Lee .................... G06Q 20/3278
  705/39
2014/0035378 A1  2/2014 Kesler et al.
2015/0123483 A1  5/2015 Leabman et al.
(Continued)

FOREIGN PATENT DOCUMENTS

| EP | 2151906 A2 | 2/2010 |
|---|---|---|
| WO | WO2011063054 A1 | 5/2011 |
| WO | WO2015066031 A1 | 5/2015 |

OTHER PUBLICATIONS

Komajwar, Aditi, et al; "Wireless Power Theft Monitoring System in Energy Meter"; National Conference on Knowledge, Innovation in Technology and Engineering (NCKITE); Apr. 10-11, 2015.
(Continued)

*Primary Examiner* — Ryan Jager
(74) *Attorney, Agent, or Firm* — L. Jeffrey Kelly

(57) ABSTRACT

Disclosed aspects relate to wireless power distribution management in an open environment. A key-pair identifier is established in a master server. The key-pair identifier can indicate both a first wireless power target device and a first wireless power source distribution center. The master server detects an indication of a wireless power coupling between the first wireless power target device and a second wireless power source distribution center. A usage assessment is determined for the wireless power coupling by the master server using the key-pair identifier. The usage assessment can relate to the first wireless power source distribution center. The master server may provide or output the usage assessment for the wireless power coupling.

18 Claims, 5 Drawing Sheets

(56) References Cited

U.S. PATENT DOCUMENTS

| | | | |
|---|---|---|---|
| 2016/0191121 A1* | 6/2016 | Bell | H04B 5/0037 |
| | | | 307/104 |
| 2016/0268843 A1 | 9/2016 | Baarman | |
| 2016/0359379 A1 | 12/2016 | Zeine et al. | |
| 2017/0099518 A1 | 4/2017 | Hsueh | |
| 2017/0346345 A1* | 11/2017 | Kurs | H01F 38/14 |

OTHER PUBLICATIONS

Zhang, Zhen, et al. "Energy encryption for wireless power transfer." Power Electronics, IEEE Transactions on 30.9 (2015): 5237-5246; Sep. 2015.

Wikimedia Foundation, Inc.; Magne Charge, <https://en.wikipedia.org/wiki/Magne_Charge>.

Waffenschmidt, Eberhard; "Resonant Coupling"; <https://www.wirelesspowerconsortium.com/technology/resonant-coupling.html>.

Wikimedia Foundation, Inc.; Inductive charging, <https://en.wikipedia.org/wiki/Inductive_charging>.

* cited by examiner

WIRELESS POWER DISTRIBUTION MANAGEMENT IN AN OPEN ENVIRONMENT

BACKGROUND

This disclosure relates generally to computer systems and, more particularly, relates to wireless power distribution management in an open environment. The amount of wireless power that needs to be managed by enterprises is increasing. Management of wireless power distribution may be desired to be performed with as efficiently as possible. As wireless power needing to be managed increases, the need for management efficiency may increase.

SUMMARY

Aspects of the disclosure relate to distributing wireless power to authorized receivers over extended ranges. Features may use advanced electromagnetic techniques and digital signal processing techniques to make wireless electricity distribution efficient over several feet while delivering electricity to authorized receiving mobile devices and not to unauthorized devices/users. As wireless electricity distribution becomes more technically feasible and economically attractive, a methodology to control power distribution over an extended range may be beneficial so as to offer wireless recharging as a service. Disclosed aspects may provide a comprehensive, end-to-end mechanism encompassing a full service life cycle from device authenticating, to device charging, to configuring secure communication, to submitting cost information, and to negotiating a set of resonant frequencies using a frequency hopping technique/sequence.

Aspects of the disclosure relate to wireless power distribution management in an open environment. A key-pair identifier is established in a master server. The key-pair identifier can indicate both a first wireless power target device and a first wireless power source distribution center. The master server detects an indication of a wireless power coupling between the first wireless power target device and a second wireless power source distribution center. A usage assessment is determined for the wireless power coupling by the master server using the key-pair identifier. The usage assessment can relate to the first wireless power source distribution center. The master server may provide or output the usage assessment for the wireless power coupling.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
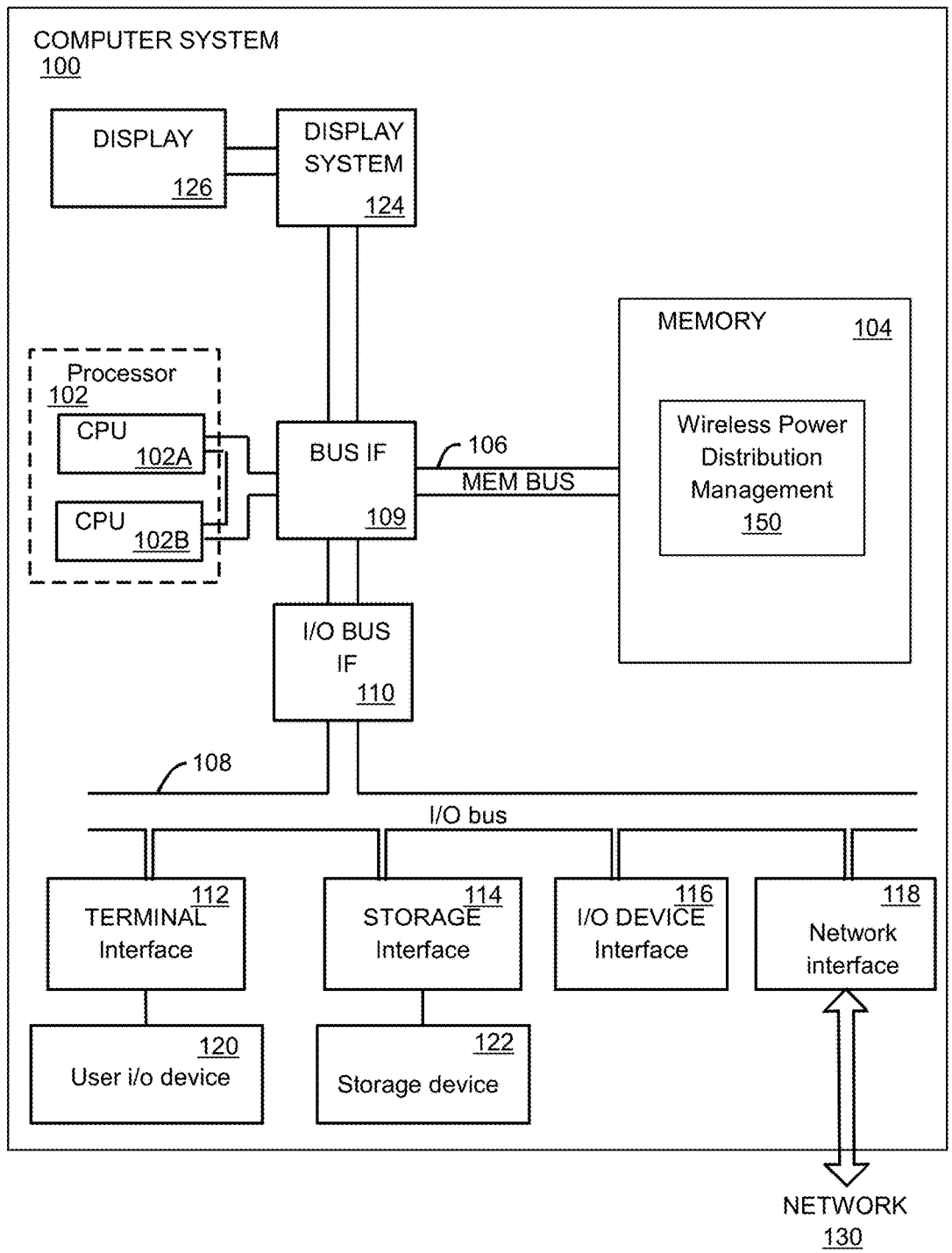
FIG. 1 depicts a high-level block diagram of a computer system for implementing various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to distributing wireless power to authorized receivers over extended ranges. Features may use advanced electromagnetic techniques and digital signal processing techniques to make wireless electricity distribution efficient over several feet while delivering electricity to authorized receiving mobile devices and not to unauthorized devices/users. As wireless electricity distribution becomes more technically feasible and economically attractive, a methodology to control power distribution over an extended range may be beneficial so as to offer wireless recharging as a service. Disclosed aspects may provide a comprehensive, end-to-end mechanism encompassing a full service life cycle from device authenticating, to device charging, to configuring secure communication, to submitting cost information, and to negotiating a set of resonant frequencies using a frequency hopping technique/sequence.

Wireless electricity services may allow for individuals to recharge mobile devices at places such as parks, hotels, break rooms, airport terminal waiting areas, hospital and clinics waiting rooms, restaurant, movie theaters, parking lots, trains, airplanes, or the like. The methodology can provide flexibility to individuals to not expose mobile devices in the open, to not pin themselves to a fixed spot, to be charged (only) for the electricity they used, and to be recharged as efficiently as possible (e.g., in a short temporal period). The methodology may protect service providers so that wireless electricity will (only) be delivered to authorized users and devices, and may not be easily taken by unauthorized users and devices. As such, charging stations and charged devices may not be next to each other but can be several feet or meters apart. Also, the methodology can manage power consumption based on a power distribution location (e.g., primary, secondary) to route usage fees back to the device owner or other appropriate individual.

Embodiments may manage access to wireless power or costing, billing, or invoicing of wireless power based on the power distribution location being utilized by the device of the individual consumer. Devices authorized to receive wireless power may be identified. Devices for a given costing location can be registered. Device registration, owner, or payment process may be tracked. Once a device has been registered or configured with a payment process, it can be automatically connected to a power distribution location. Access from a secondary location with power consumption costs to be billed to primary registered location for device may be authorized/granted. Power consumption for unauthorized devices can be blocked (e.g., unregistered devices blocked from usage using base location server settings). For example, a homeowner having a device that supports wireless electricity such as a mobile handheld unit, automobile, television, or other electronic item is configured to be billed for electric consumption for devices officially registered to the location. Neighbors may be restricted from consuming power from a power distribution center of the homeowner.

Aspects of the disclosure include various embodiments of a method, system, and computer program product for wireless power distribution management in an open environment. A key-pair identifier is established in a master server. The key-pair identifier can indicate both a first wireless power target device and a first wireless power source distribution center. The master server detects an indication of a wireless power coupling between the first wireless power target device and a second wireless power source distribution center. A usage assessment is determined for the wireless power coupling by the master server using the key-pair identifier. The usage assessment can relate to the first wireless power source distribution center. The master server may provide or output the usage assessment for the wireless power coupling.

In embodiments, the first wireless target device is registered with the first wireless power source distribution center using a set of identifiers. The first wireless target device may be authorized to receive wireless power and a second wireless target device may be prevented from receiving wireless power. In embodiments, a distribution of wireless power is monitored using the wireless power coupling from the second wireless power source distribution center to the first wireless power target device. The wireless power coupling can be maintained using a plurality of resonant frequencies. To prevent unauthorized devices from accessing wireless power, the plurality of resonant frequencies may be switched-among using a frequency hopping technique. In embodiments, the usage assessment is computed by allocating the distribution of wireless power to the first wireless power source distribution center.

In various embodiments, the plurality of resonant frequencies is monitored with respect to a set of actual power discharges. A set of authorized power discharges may be recorded in a database. To detect an unauthorized power discharge to an unauthorized device, the set of authorized power discharges can be compared with the set of actual power discharges. Based on and in response to monitoring the plurality of resonant frequencies with respect to the set of actual power discharges, the unauthorized power discharge to the unauthorized device may be detected.

In various embodiments, the frequency hopping technique is adjusted in response to detecting the unauthorized power discharge to the unauthorized device. To adjust the frequency hopping technique, a set of frequency hopping parameters may be modified with respect to both the first wireless power target device and the second wireless power source distribution center. Altogether, aspects of the disclosure may have various performance or efficiency benefits (e.g., wear-rate, service-length, speed, flexibility, load balancing, responsiveness, high availability, resource usage, productivity). Aspects may save resources such as bandwidth, processing, or memory.

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a wireless power distribution management application 150. In embodiments, the wireless power distribution management application 150 may include instructions or statements that execute on the processor 102 or instructions or statements that are interpreted by instructions or statements that execute on the processor 102 to carry out the functions as further described below. In certain embodiments, the wireless power distribution management application 150 is implemented in hardware via semiconductor devices, chips, logical gates, circuits, circuit cards, and/or other physical hardware devices in lieu of, or in addition to, a processor-based system. In embodiments, the wireless power distribution management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
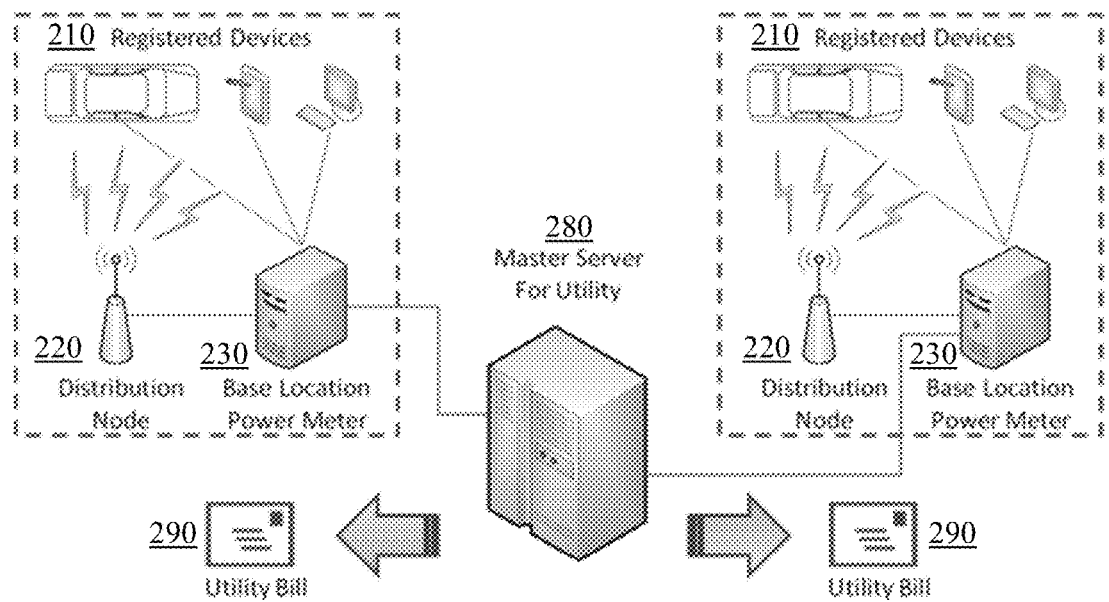
FIG. 2 is a diagrammatic illustration of an example system for implementing wireless power distribution management, according to embodiments.

FIG. 2 is a diagrammatic illustration of an example system 200 for implementing wireless power distribution management, according to embodiments. The wireless power distribution management may be consistent with the description herein including FIGS. 1-5. The example system 200 may illustrate device connectivity and payment routing elements. Aspects described herein include a finite ability to control power distribution while simultaneously managing billing of power consumption. Users can pay for, and utilities can charge for, usage regardless of the location. For instance, registered devices 210 may be linked to a base location power meter 230 and can receive power from a distribution node 220. The base location power meter 230 can tie-in to a master server 280 which may use the information supplied to generate a utility bill 290.

Figure 3:
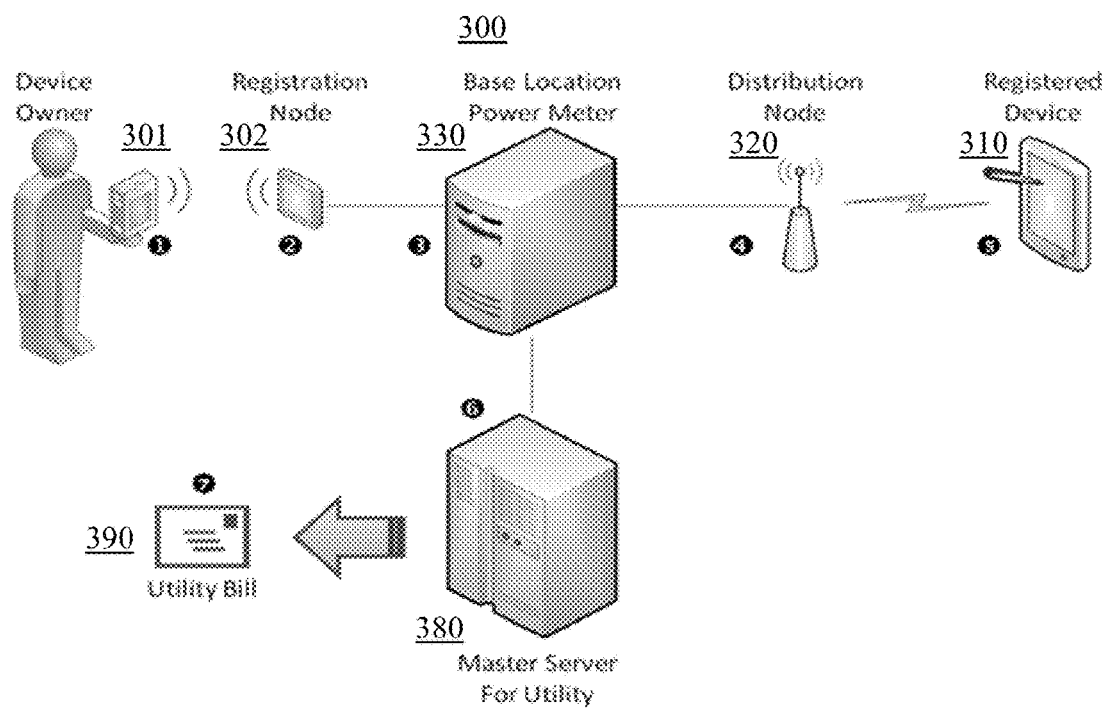
FIG. 3 is a diagrammatic illustration of an example system for implementing wireless power distribution management, according to embodiments.

FIG. 3 is a diagrammatic illustration of an example system 300 for implementing wireless power distribution management, according to embodiments. The wireless power distribution management may be consistent with the description herein including FIGS. 1-5. The example system 300 may illustrate that payment can be routed through a primary base location. A device owner 301 can register a device to be a registered device 310 using a registration node 302. Accordingly, the registered device 310 may receive power from a distribution node 320. Both the registration node 302 and the distribution node 320 may be linked to a base location power meter 330 to facilitate allocation of associated costs for power distributed. The base location power meter 330 can tie-in to a master server 380 which may use the information supplied to generate a utility bill 390.

Figure 4:
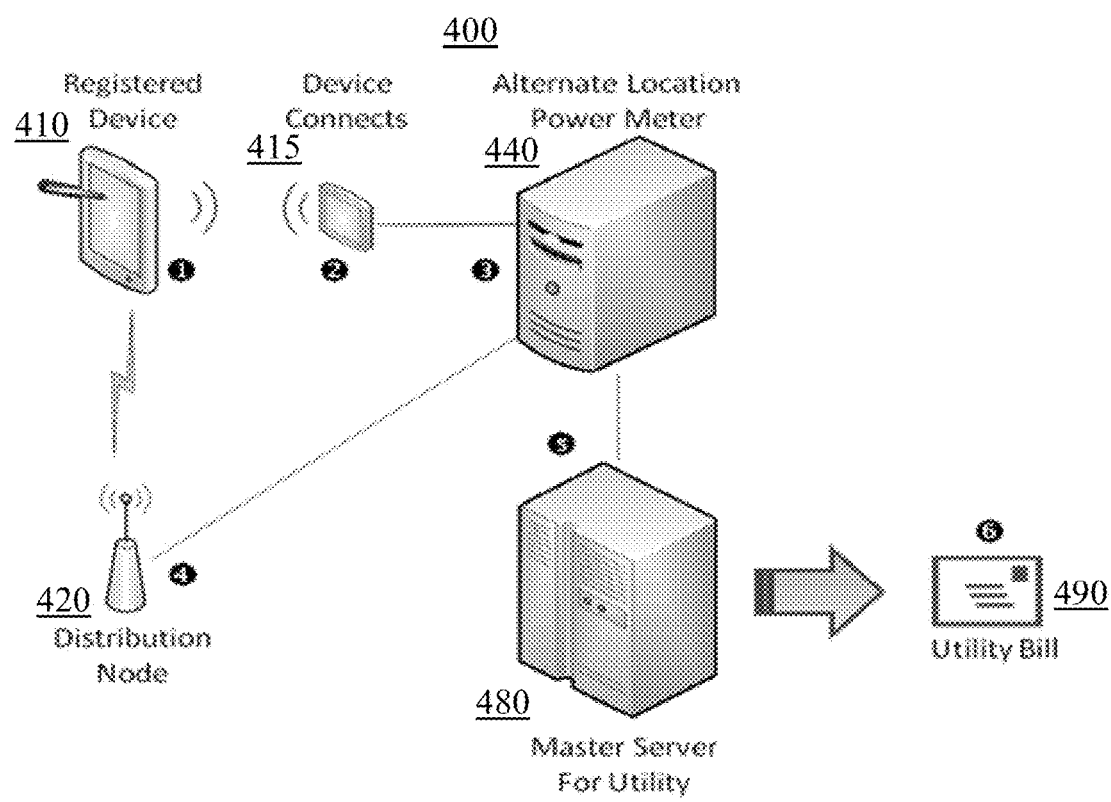
FIG. 4 is a diagrammatic illustration of an example system for implementing wireless power distribution management, according to embodiments.

FIG. 4 is a diagrammatic illustration of an example system 400 for implementing wireless power distribution management, according to embodiments. The wireless power distribution management may be consistent with the description herein including FIGS. 1-5. The example system 400 may illustrate that payment may be routed through a secondary base location. A registered device 410 may communicate with device connects 415 to be connected with an alternate location power meter 440. The alternate location power meter 440 may be linked with a distribution node 420 for power supply to the registered device 410 and can tie-in to a master server 480 which may use the information supplied to generate a utility bill 490.

To illustrate, airport operational expenses related to wireless power may be positively impacted or reduced by billing travelers that recharge portable devices while waiting in the gateway. The airport facility or airline can designate power expenses to the appropriate device owner. As the batteries are recharged, the usage fees can be simultaneous and in real-time routed directly to the consumer. To further illustrate, power consumption for planes parked at the gateway may be billed to the airline company.

For another example, consider electric vehicles which can charge batteries while driving cross country. Power costs associated with a trip can automatically be billed without stopping to pay along the way. Payment can be made on the go. As such, consumers can pay for usage without having to manage the payment itself. The wireless power methodology can extend an overall capability of the devices, the billing process can provide streamlined management of the costs for the consumer.

A power source identifier, device identifier, a payment process, and device owner may be utilized to implement aspects described herein. The payment method may determine how expenses will be paid. The power source identifier can determine power source location and ultimately where to route payment. The device owner may determine who is responsible for payment. Device registration can determine if power access is permitted or denied.

For instance, the device can initiate a network connection using various communication methods (e.g., Bluetooth, radio frequency identification, network cable, wireless card) to a registration node for a given residential or commercial address. A power distribution point or base location can be open access or restricted. An open access location may provide low-cost/free power or may allow access based on certain parameters/values such as a pre-configured payment (e.g., credit card) or pre-registered base location. An administrator (e.g. home owner, business owner, authorized individual) can grant or reject access to restricted locations.

New devices may be registered to a base location or configured with a payment process before the device is connected to an open access or restricted location. If the device has been previously registered to a secondary base location, the administrator can select to automatically permit access or may grant temporary access and invoice power consumption to the owner of the device. The device may store power consumption and can transmit usage information to the base location power meter. Such information can be periodically relayed to the master server or associated payment process with the device. The consumer may be subsequently billed as per a normal bill cycle. If the user is using an alternate power source, the payment can be routed through a secondary master server based on the routing information.

A device/instrument may be assigned a (unique) device identifier and configured with a default payment process (e.g., credit card, cellular phone number, primary power utility). As the device consumes power, the power usages/charges can be automatically routed to the designated payment center associated with the device. Each base location can have a unique location identifier (e.g., a base location identifier, wireless power source distribution center identifier). The device can be registered to a base location when a power source is identified. If no payment process is specified, the device will can be automatically configured and matched upon the connection to the initial power source. The location can then be associated with the device and may become the primary payment center tied to the device. For example, a residential address may be the primary base location for private consumer devices.

The combination of the device identifier and the base location identifier (or wireless power source distribution center identifier) can be used to create a (unique) key-pair identifier. The key-pair identifier may be subsequently stored in a master server and used to track power consumption for a given device. Base locations may register new devices, enable power distributions, and prevent power distributions. When a device connects at the base location, power consumption may be automatically tracked and billed to the base location. When the device connects through an alternate location, power consumption may be relayed to the master server. The key-pair identifier may be utilized to determine who is responsible for the power costs associated with the alternate location. The usage costs can be deducted from the appropriate individual such as the owner of the alternate location and applied to the base location associated with the device. The device can track power usage and relay information to the location where the device is connected. The site location may subsequently transmit usage to the associated master location. The master location can be responsible for billing based on power consumption of the device at the base location or alternate location.

In embodiments, multiple master servers may be utilized including when both are within a single company and when they are across multiple companies. Accordingly, a unique master server identifier may be associated with each database. The unique master server identifier can facilitate the routing of information to the appropriate server responsible for tracking power consumption for a particular device. To offset the possibility of a single device being registered to multiple servers, the master server may include a timestamp for when the device is registered. A most-current record can indicate the most current billing information. Together, a database entry with the most current timestamp may be considered an appropriate master server. The timestamp can also trigger conflict reports for system administration purposes. For example, if an individual moves to a new address and the previous power company does not correctly deactivate the account. If a payment method has been specified, then the device may not need to be registered and can automatically consume power without additional configuration.

Disclosed aspects leverage both electromagnetism techniques to efficiently couple components over extended ranges and spread spectrum digital signal processing techniques to forbid unauthorized receivers. Features can extend the charging distance so that customers do not need to stay in a fixed location (e.g., mobility, flexibility, move while charging). Various magnetism techniques may facilitate aspects such as allowing movement while charging. For example, higher frequency electromagnetic waves may be used to have positive impacts on efficiency. As another example, extended range wireless charging can be achieved by matching transmitter and receiver resonant frequency. A resonance of a receiving coil and a transmitting coil can help create a strong coupling by reducing/eliminating stray inductance. As a result, the distance between transmitter and receiver can be extended to two or three meters with positive impacts on charging efficiency.

Furthermore, a transmitter and a receiver may be controlled to run at one of multiple configurable resonant frequencies by electronically controlling configurable capacitance and inductance of both the transmitter and the receiver (instead of passively tuning the transmitter and the receiver to run as resonant frequency). As such, aspects described herein may guard against unauthorized users from taking charging services. Accordingly, the inductance and capacitance of the transmitting coil may be controlled. Parameters may be shared only to an authorized receiving coil in order to tune to the transmitting coil.

To deter other receivers from guessing the parameters, a frequency hopping technique may be used so that only the authorized receiver can stay/maintain a resonant relationship with respect to the transmitting coil. In response to a receiver sharing its inductor parameters with a transmitter (e.g., its natural stray inductance and capacitance characters and configurable inductances and capacitance settings), the transmitter may tune to receiver stray inductance and capacitance and can command the receiver to hop through configurable inductance and capacitance combinations in synchronized steps in order to stay in a resonant state at different frequencies. As such, the authorized receiver can stay in synchronized resonant frequency so as to receive the electricity charging service efficiently while deterring unauthorized receivers. Accordingly, aspects of the disclosure include a method to provide fee based wireless electricity distribution efficiently and effectively only to authorized devices by keeping transmitter and receiving device at one of many resonant frequencies while hopping through those resonant frequencies in locked steps to prevent unauthorized devices from taking the service.

Figure 5:
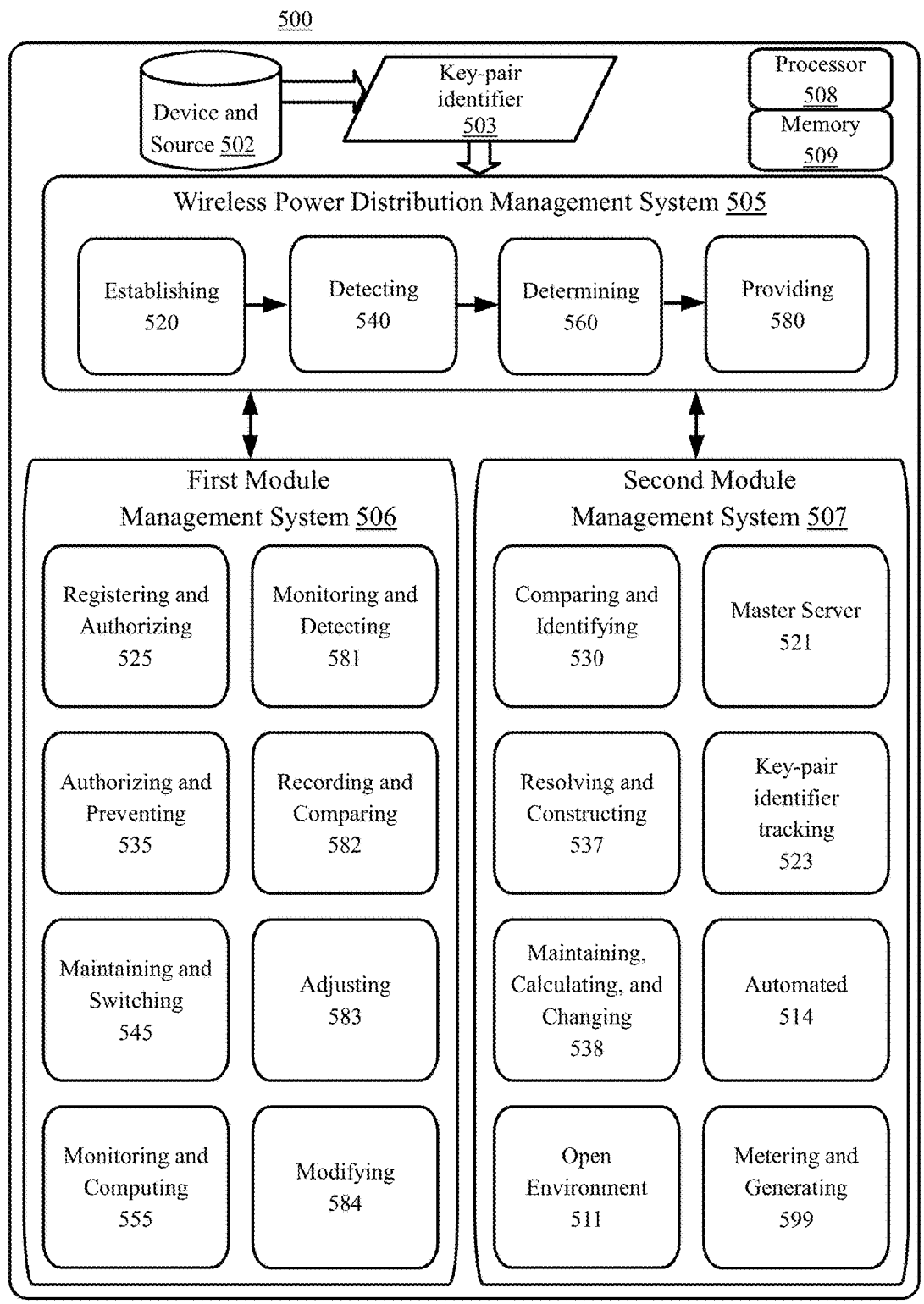
FIG. 5 depicts an example system architecture for implementing a method for wireless power distribution management, according to embodiments.

FIG. 5 depicts an example system architecture 500 for implementing a method for wireless power distribution management, according to embodiments. Aspects of the system architecture 500 relate to distributing wireless power to authorized receivers over extended ranges in an automated fashion without manual intervention from a user or network administrator. The system 500 may include a processor 508, memory 509, a device (e.g., wireless power target device) and source (e.g., wireless power source distribution center) 502, a key-pair identifier 503, a wireless power distribution management management system 505, a first module management system 506, a second module management system 507 and a number of modules, sub-modules, and other operations configured to facilitate wireless power distribution management. For instance, wireless power distribution management management system 505 includes an establishing module 520, a detecting module 540, a determining module 560, and a providing module 580. The method, system, and computer program product features described herein are not limited to the specifically described embodiments, but instead any combination of the disclosed features and elements is contemplated.

At establishing module 520, a key-pair identifier is established in a master server. Establishing can include storing, saving, compiling, structuring, constructing, forming, creating, generating, or introducing. The master server may have a database of key-pair identifiers for a plurality of combinations. For instance, the master server may be run by a utility company which distributes power to registered devices using information such as the key-pair identifier. The key-pair identifier can indicate both a first wireless power target device (e.g., set of devices to receive power) and a first wireless power source distribution center (e.g., a set of sources involved in transmitting power). The key-pair identifier may be used to track power consumption for a given device (e.g., the first wireless power target device at module 523). As such, the key-pair identifier may be utilized to determine who is responsible for the power costs associated with various source locations. For example, a utility company may introduce a key-pair identifier based on an owner (e.g., Acme corporation), division (e.g., Acme sales division), user (e.g., Acme external sales manager), device (e.g., tablet computer of the Acme regional sales manager), region (e.g., Chicago suburbs), and utility home (e.g., Bearcat River utility company). The key-pair identifier (e.g., a unique number) may be a merged version of such factors so as to assign power and costs appropriately.

At detecting module 540, the master server detects an indication of a wireless power coupling between the first wireless power target device and a second wireless power source distribution center. Detecting can include sensing, receiving, observing, or the like. The indication may include a notification, data packet transmission, usage of authentication tokens, or the like. The wireless power coupling can include a connection, linkage, or other tie-in for the first wireless power target device to receive wireless electricity from the second wireless power source distribution center. For example, the Acme regional sales manager may desire to charge the tablet computer while stopping to use the facilities, fill-up gasoline, and get coffee at the Bearcat River convenience store before heading-out on sales visits for the day. Aspects described herein may allow for the tablet computer to be taken with the Acme regional sales manager in a briefcase to the various spots on the convenience store premises while maintaining the wireless coupling.

At determining module 560, a usage assessment is determined for the wireless power coupling by the master server using the key-pair identifier. Determining can include ascertaining, identifying, resolving, evaluating, formulating, measuring, computing, or calculating. The usage assessment can relate to the first wireless power source distribution center. The usage assessment can include quantitative (e.g., how much) and qualitative (e.g., what type) factors corresponding with the wireless power and various costs. For example, the usage assessment may provide that the Acme regional sales manager, on one occasion at the Bearcat River convenience store, accessed 10 units of wireless power at a rate of 0.2 cents per unit and 5 units of wireless power at a rate of 0.3 cents per unit (e.g., different areas on the premises may be assigned different rates based on the needed range). As such, by utilizing the key-pair identifier registered at the Bearcat River utility company to identify the tablet computer, 3.5 cents of wireless power may be added to a future invoice to be generated and sent to Acme corporation.

At providing module 580, the master server may provide or output the usage assessment for the wireless power coupling. Providing or outputting can include a presentation (e.g., audio), a display (e.g., on a graphical user interface), or a notification (e.g., e-mail, text message, letter). For example, in response to the wireless power coupling no longer existing for a threshold period of time (e.g., 15 minutes), the master server may transmit a message notifying the usage of 3.5 cents. Such message may be automatically played via audio to the Acme regional sales manager. Various forms of providing are contemplated.

In embodiments, the first wireless target device is registered (e.g., cataloged, enrolled, enlisted) with the first wireless power source distribution center using a set of identifiers (e.g., unique characters) at module 525. Such registration may be obligatory in order to receive wireless power, and may be performed automatically in response a triggering event (e.g., powering-on with an access code) when the first wireless target device is within range of the first wireless power source distribution center (e.g., a car may be registered to a car dealership). The first wireless target device may be authorized (e.g., allowed, licensed) to receive wireless power at module 525 or module 535. In embodiments, a second wireless target device may be prevented (e.g., disallowed, prohibited, denied) from receiving wireless power at module 535 (e.g., it has never been registered, it is not registered for certain types of distribution nodes). Such authorizations/preventions may be based on comparing database values to determine matches/mismatches.

In embodiments, a distribution of wireless power is monitored using the wireless power coupling from the second wireless power source distribution center to the first wireless power target device at module 555. Monitoring can include observing a transfer of wireless electricity. In certain embodiments, monitoring may be performed to detect leaks/escapes, overages/extras, or nefarious consumption of electricity (e.g., by another device tapping-into the coupling). The wireless power coupling can be maintained (e.g., continued, sustained, preserved) using a plurality of resonant frequencies at module 545. To prevent unauthorized devices from accessing wireless power, the plurality of resonant frequencies may be switched-among using a frequency hopping technique at module 545. Accordingly, the resonant frequencies may be varied in an algorithmic manner such as a round-robin usage of available frequencies while skipping at least one available frequency during a temporal period (e.g., 30 seconds) based on a random number generator (e.g., counting available frequencies until the first numerical value of the number generator is skipped). The usage assessment may be computed by allocating the distribution of wireless power to the first wireless power source distribution center at module 555. As such, wireless power received from other sources may be accounted-for by the first wireless power source distribution center (e.g., a home utility of a consumer of the wireless power).

In various embodiments, the plurality of resonant frequencies is monitored with respect to a set of actual power discharges (e.g., beyond merely requested discharges but what power has actually been dispersed) at module 581. A set of authorized power discharges (e.g., requested dispersions fulfilled) may be recorded in a database at module 582. To detect an unauthorized power discharge to an unauthorized device, the set of authorized power discharges can be compared with the set of actual power discharges at module 582. Based on and in response to monitoring the plurality of resonant frequencies with respect to the set of actual power discharges, the unauthorized power discharge to the unauthorized device may be detected at module 581. For example, when the set of actual power discharges exceeds the set of authorized power discharges by a threshold value a trigger may alert the detection feature for logging purposes and potential unauthorized discharge response actions.

In various embodiments, the frequency hopping technique is adjusted (e.g., modifying the frequency hopping technique by changing algorithms) in response to detecting the unauthorized power discharge to the unauthorized device at module 583. To adjust the frequency hopping technique, a set of frequency hopping parameters may be modified with respect to both the first wireless power target device and the second wireless power source distribution center at module 584. For example, the first wireless power target device may change a receiving rate (e.g., increasing power receipt rate threshold) and the second wireless power source distribution center may select a different algorithm to transfer power faster (e.g., hop frequencies less frequently but do so in a more random way such as by squaring all aspects of the algorithm to provide larger computational values). Accordingly, aspects described herein can provide power coupling efficiency monitoring and dynamic adjustment of both resonant frequencies and the frequency hopping sequence when power dissipation to unauthorized devices is detected (e.g., by the first wireless power target device).

In embodiments, a set of candidate wireless power source distribution centers is compared with the second wireless power source distribution center at module 530. The comparison is made with respect to a power transfer efficiency (e.g., nearest source by distance, expected throughput, resources to be expended such as processor/memory, source reliability). Based on the power transfer efficiency, the second wireless power source distribution center can be identified (e.g., it is expected to be more efficient than a threshold number of the set of candidate wireless power source distribution centers such as all of them) at module 530. Such aspects may be carried-out in an automated fashion without user intervention.

In embodiments, a power transfer frequency value for the first wireless target device (e.g., how often wireless power is sought) is resolved/determined to exceed a power transfer frequency threshold (e.g., an average or quartile of registered devices) at module 537. In response to the resolving, a steadfast wireless power connection can be constructed for the first wireless target device. Accordingly, devices which seek to be charged frequently or which struggle to keep a connection may have a consistent connection constructed (e.g., a laptop computer which does not keep a charge) at module 537. In certain embodiments, the threshold may be configured such that most devices have the steadfast wireless power connection constructed (e.g., for reliability purposes).

In certain embodiments, using a plurality of resonant frequencies, the steadfast wireless power connection can be maintained at module 538 (e.g., using a frequency hopping technique which is relatively more stable than others). Based on movement by the first wireless target device (e.g., away from its power source), a threshold decrease in the power transfer frequency value may be calculated at module 538 (e.g., not as much power is being transferred resulting in lesser throughput). In response to calculating the threshold decrease in the power transfer frequency value, the wireless coupling among a set of candidate wireless power source distribution centers can be changed at module 538 (e.g., select a new power source to increase power transfer efficiency via a greater frequency).

In various embodiments, the master server is operated for a utility which is corporately-unaffiliated from the second wireless power source distribution center at module 521. As such, aspects described herein may be utilized industry-wide without needing to be oriented for only one utility provider. Accordingly, such benefits may have positive impacts on overall resource usage (e.g., computing resources such as processor, memory, or bandwidth) and energy efficiency (e.g., electricity burdens) industry-wide.

In embodiments, a set of operational steps (e.g., the establishing, the detecting, the determining, the providing) each occur in an automated fashion without user intervention at module 514. A fully-automated system may provide various performance or efficiency benefits as described herein. In certain embodiments, use of the wireless power distribution management may be metered at module 599. For example, power leakage savings may be measured or cost benefits relative to a benchmark (e.g., historical power usage) can be evaluated, etc. Such factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use at module 599. The generated invoice may be provided (e.g., displayed in a dialog box, sent or transferred by e-mail, text message, initiated for traditional mail) to a user/owner for notification, acknowledgment, or payment.

The open environment can include various possibilities at module 511. As illustrative examples, the open environment may be indoor or outdoor, stationary or in-transit, public or private, etc. As examples, the open environment may include an outdoor public park open to individuals without a fee (e.g., a city park), an outdoor sports venue open to individuals with an electronic entrance ticket (e.g., a baseball game), a public transportation vehicle (e.g., a train), a private consumer vehicle (e.g., a minivan), an indoor auditorium open to individuals with an electronic invitation (e.g., a charity concert), or an indoor airport waiting area open to individuals that pass an electronic-based security check (e.g., an international airport). Various other possibilities are contemplated.

As described herein, wireless power distribution/charging methodologies/services may be configured to transfer power to small portable devices such as mobile devices and tablets in open environments such as public areas as the examples that follow illustrate. Throughout the charging process, the devices being charged may not need to be stationary nor need to have physical contact to a charging station. The devices being charged may simply stay within a range (e.g., 10 feet) of a charging station. A charging station can be mounted under a seat or under a coffee table for example. As another example, a charging station may be installed inside a post in a lobby. An individual can walk around near the post or find a nearby seat to use the charging service. Visual signs may be posted to help individuals find a charging station. To use the charging service, an individual can register with the service, find available charging stations within range to the device to be charged, and pair the device with a suitable charging station. A device to be charged generally has a data transfer capability to engage in initialization and authorization process to enable the charging service. During the charging process, both the charging station and a device being charged may monitor efficiency of the charging service and can detect if there may be any unauthorized device trying to share the charging service. Two-way communication (e.g., via wireless communication, via Bluetooth communication) may be utilized for the charging station and the device being charged to adjust resonant frequencies and frequency hopping sequence (e.g., to deter unauthorized devices). Two-way communication may also allow the charging station to terminate the charging service upon a termination command from the device being charged or when the device being charged (abruptly) leaves the charging service. Various example algorithms may be utilized.

With respect to discovery and authorization, users can register their portable device to the charging services (or they may be registered automatically) and the device can be paired with a most suitable charging station in range. For instance, a user may select an area with a charging station and request services by accessing the charging service website. A user can starts the charging service application and enter an identification number of a nearby charging station to initiate pairing of that charging station and the device to be charged. The charging service can instruct the selected charging station and the device to be charged to pair with each other (e.g., via either wireless communication, via Bluetooth communication). In the pairing process, the charging station and the device to be charged may use secure communication protocols to keep a charging parameters negotiation and an agreed value private. In the negotiation process, the charging station and device may select some or all of a group of resonant charging frequencies that are common to them, a random frequency hopping sequence, and a time duration to stay on each resonant frequency. At the conclusion of the secure negotiation process, the charging service may start. Thereafter, the charging station and the device can hop through the resonant frequencies in locked step.

When an identification of a charging station is not visible (e.g., a display sign wearing off, viewing condition is sub-par, lighting is weak), the charging service may instruct all charging stations in the vicinity to test charging the device to determine the most suitable charging station. In such an automated discover mode, each and every charging station in the vicinity may try to charge the device at a pre-agreed resonant frequency for a short duration of time (e.g., 1 second). During the time period, the device may measure the efficiency of the power transfer. A resonant frequency can be selected at random by the charging service and be communicated to both the charging station and to the device to be charged via the charging service application. The device may report a power transfer efficiency to the charging service via the application to facilitate the charging service in selecting a next charging station to test charging. If the power transfer efficiency is below a threshold, the charging service may select another charging station further away from the current charging station to determine if such charging station will be closer in distance to the device. If the power transfer efficiency exceeds a threshold the charging service may select another charging station nearby to see if that will further positively impact the power transfer efficiency. Such process may continue until a preferred charging station is identified which achieves a predetermined efficiency value. Once the preferred charging station is determined, the charging service may instruct the preferred charging station and the device to begin the negotiation process as described herein.

The charging service may offer steadfast/constant charging service to frequent charging customers. When a customer remains in an area of charging stations, the charging service application may initiate the charging request automatically. The charging service can then instruct a charging station in the vicinity of such device to determine a preferred charging station as described above. During the charging process, if a customer and the device being charged moved away from the preferred charging station, the application can report a drop in power transfer efficiency due to moving, and request the charging service to consider a set of alternative charging stations. If an alternative charging station most suitable for the device is already serving other customers and devices, the charging service may instruct the alternative charging station to send charging parameters, including resonant frequencies, frequency hopping sequence, and duration to the device so that it can share the charging station and charging service with other authorized devices. Such automatic handing-over of charging stations may allow customers freedom to move around while devices are being charged.

With respect to unauthorized device prevention, both charging stations and devices being charged may (constantly) monitor power transfer efficiency not only for both service quality and to guard against unauthorized use of the charging service. An unauthorized device may stay on one resonant frequency that happen to be one of the frequencies by the frequency hopping algorithm to utilize a portion of the charging service. When a charging station senses extra power on a specific resonant frequency, and when a device being charged senses inefficient power transfer on the specific resonant frequency, the charging station and device being charged may initiate a renegotiation to remove the particular frequency and to determine a new set of resonant frequencies to prevent unauthorized devices from using the charging service. If a charging station detects an increased power transfer at more than a threshold number of frequencies, and if a device being charged senses a drop in power transfer efficiency at more than a threshold number of the frequencies, it is an indication that an unauthorized device may have successfully guessed the resonant frequencies being used (as well as the frequency hopping sequence/duration). The charging station and the device being charged can start a renegotiation to determine a different set of resonant frequencies, a new random frequency hopping sequence and duration to deter/prevent unauthorized devices from taking advantage of the charging service.

When both a charging station and a device being charged sense a drop in power transfer efficiency, a charging challenge may have been identified. Obstacles may have moved in the path of power transfer, the device being charged may have changed its physical orientation which can impact the wireless power coupling, or the device being charged may be moving away from the charging station. The charging station and the device being charged may try an automatic handing-over to another nearby charging station to determine if that can improve the quality of charging service.

With respect to charging service termination, termination of the charging service may be initiated by a device being charged or by a charging station. A customer or a device being charged may determine to terminate the charging service when the device being charged is nearly full, full, or when a customer desires to leave the charging station area (e.g., leaving the terminal waiting area and boarding an airplane). A charging station may initiate a termination of the charging service if the device being charged cannot not be detected any more (e.g., has been powered-off).

Charging stations may monitor power transfer efficiency on a continual basis to positively impact quality of charging service, to guard against unauthorized devices, and to facilitate automatic charging station hand-over when a device being charged physically moves away and into a charging range of another charging station. When a device being charged is handed-over from one charging station to another charging station, the charging service can continue even though it is being delivered by another charging station. When a device being charged is turned-off or moves away from a charging area where there is no alternative charging station in range, the charging station that was serving the device can initiate communication to the device to notify the (expected) conclusion of the charging service. If communication to the device is not successful, that is further evidence that a device is turned-off or has moved far away. As such, at this point the charging station can terminate the charging service and stop the usage assessment or billing.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for wireless power distribution management in an open environment, comprising:
    establishing, in a master server, a key-pair identifier which indicates both a first wireless power target device and a first wireless power source distribution center;
    detecting, by the master server, an indication of a wireless power coupling between the first wireless power target device and a second wireless power source distribution center;
    causing the second wireless power source distribution center to distribute wireless power to the first wireless power target device;
    monitoring, using the wireless power coupling, the distribution of wireless power from the second wireless power source distribution center to the first wireless power target device;
    determining, by the master server using the key-pair identifier, a usage assessment for the wireless power coupling between the first wireless power target device and the second wireless power source distribution center; and
    computing the usage assessment by allocating the distribution of wireless power to the first wireless power source distribution center;
    providing, by the master server, the usage assessment for the wireless power coupling.

2. The method of claim 1, further comprising:
    registering, using a set of identifiers, the first wireless target device with the first wireless power source distribution center; and
    authorizing the first wireless target device to receive wireless power.

3. The method of claim 2, further comprising:
    comparing, with respect to a power transfer efficiency, a set of candidate wireless power source distribution centers with the second wireless power source distribution center; and
    identifying, based on the power transfer efficiency in an automated fashion without user intervention, the second wireless power source distribution center.

4. The method of claim 1, further comprising:
    authorizing the first wireless target device to receive wireless power; and
    preventing a second wireless target device from receiving wireless power.

5. The method of claim 4, further comprising:
    resolving that a power transfer frequency value for the first wireless target device exceeds a power transfer frequency threshold; and
    constructing, in response to the resolving, a steadfast wireless power connection for the first wireless target device.

6. The method of claim 5, further comprising:
    maintaining, using a plurality of resonant frequencies, the steadfast wireless power connection;
    calculating, based on movement by the first wireless target device, a threshold decrease in the power transfer frequency value; and
    changing, in response to calculating the threshold decrease in the power transfer frequency value, the wireless coupling among a set of candidate wireless power source distribution centers.

7. The method of claim 1, further comprising:
    maintaining, using a plurality of resonant frequencies, the wireless power coupling; and
    switching, to prevent unauthorized devices from accessing wireless power, among the plurality of resonant frequencies using a frequency hopping technique.

8. The method of claim 7, further comprising:
    monitoring, with respect to a set of actual power discharges, the plurality of resonant frequencies; and
    detecting, based on and in response to monitoring the plurality of resonant frequencies with respect to the set of actual power discharges, an unauthorized power discharge to an unauthorized device.

9. The method of claim 8, further comprising:
    recording, in a database, a set of authorized power discharges; and
    comparing, to detect the unauthorized power discharge to the unauthorized device, the set of authorized power discharges with the set of actual power discharges.

10. The method of claim 8, further comprising:
    adjusting, in response to detecting the unauthorized power discharge to the unauthorized device, the frequency hopping technique.

11. The method of claim 10, further comprising:
    modifying, with respect to both the first wireless power target device and the second wireless power source distribution center, a set of frequency hopping parameters to adjust the frequency hopping technique.

12. The method of claim 1, wherein the open environment is selected from a group consisting of: an outdoor public park open to individuals without a fee, an outdoor sports venue open to individuals with an electronic entrance ticket, a public transportation vehicle, a private consumer vehicle, an indoor auditorium open to individuals with an electronic invitation, and an indoor airport waiting area open to individuals that pass an electronic-based security check.

13. The method of claim 1, wherein the master server is operated for a utility which is corporately-unaffiliated from the second wireless power source distribution center.

14. The method of claim 1, wherein the key-pair identifier is used to track power consumption for the first wireless power target device.

15. The method of claim 1, wherein the establishing, the detecting, the determining, and the providing each occur in an automated fashion without user intervention.

16. The method of claim 1, further comprising:
    metering use of the wireless power distribution management; and
    generating an invoice based on the metered use.

17. A computer-implemented method for wireless power distribution management in an open environment, comprising:
    establishing, in a master server, a key-pair identifier which indicates both a first wireless power target device and a first wireless power source distribution center;
    detecting, by the master server, an indication of a wireless power coupling between the first wireless power target device and a second wireless power source distribution center;
    causing the first wireless power target device to receive power from the second wireless power source distribution center;
    monitoring, using the wireless power coupling, the distribution of wireless power from the second wireless power source distribution center to the first wireless power target device;
    determining, by the master server using the key-pair identifier, a usage assessment for the wireless power coupling between the first wireless power target device and the second wireless power source distribution center; and computing the usage assessment by allocating the distribution of wireless power to the first wireless power source distribution center;

providing, by the master server, the usage assessment for the wireless power coupling.

18. A computer-implemented method for wireless power distribution management in an open environment, comprising:

establishing, in a master server, a key-pair identifier which indicates both a first wireless power target device and a first wireless power source distribution center;

detecting, by the master server, an indication of a wireless power coupling between the first wireless power target device and a second wireless power source distribution center;

causing a battery of the first wireless power target device to charge in response to the first wireless power target device receiving power from the second wireless power source distribution center;

monitoring, using the wireless power coupling, the distribution of wireless power from the second wireless power source distribution center to the first wireless power target device;

determining, by the master server using the key-pair identifier, a usage assessment for the wireless power coupling between the first wireless power target device and the second wireless power source distribution center; and computing the usage assessment by allocating the distribution of wireless power to the first wireless power source distribution center;

providing, by the master server, the usage assessment for the wireless power coupling.

\* \* \* \* \*